K. FITZPATRICK.
SPEED REGISTER.
APPLICATION FILED JUNE 17, 1914.
1,178,791.
Patented Apr. 11, 1916.
2 SHEETS—SHEET 1.
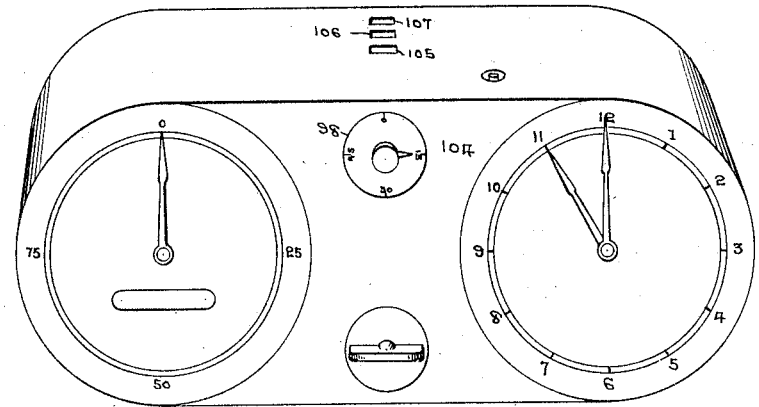
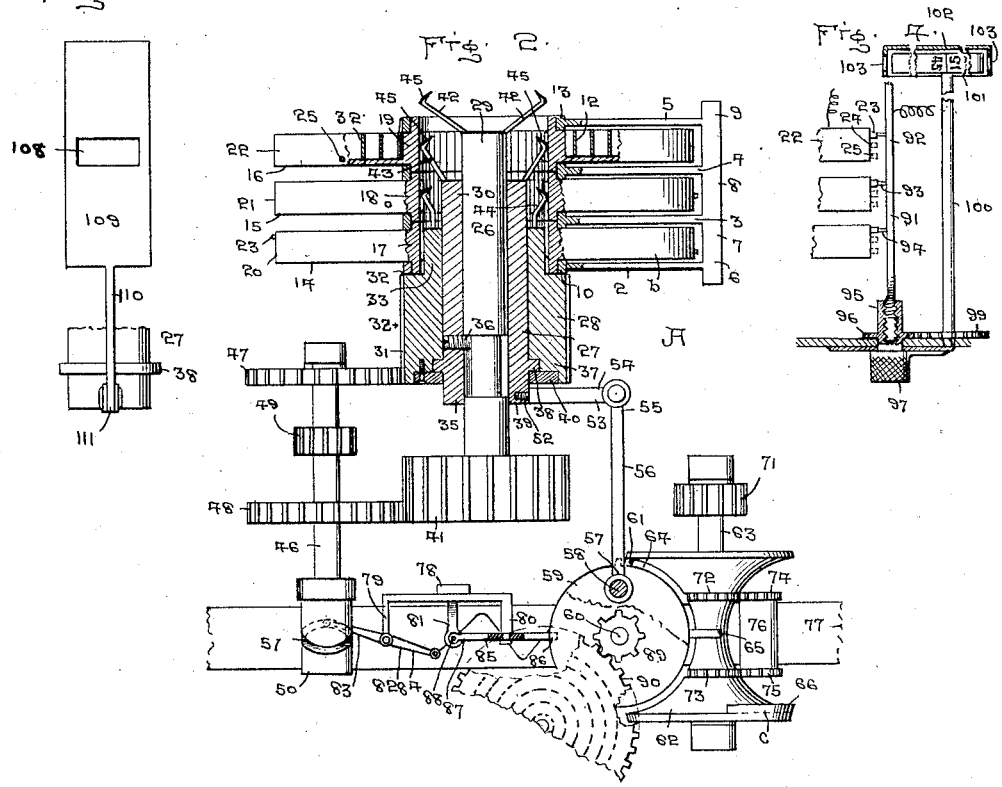
Inventor
Kirly Fitzpatrick
By W. H. Singleton
Attorney
Witnesses
Ogle R. Singleton

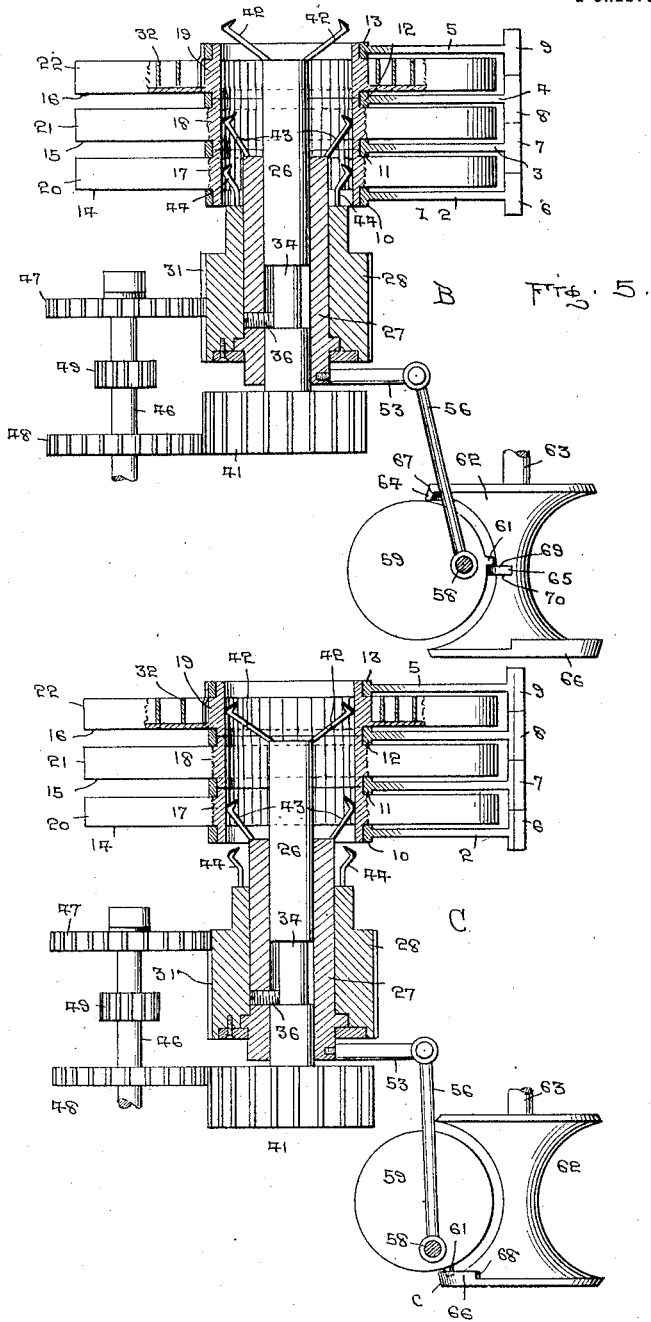

UNITED STATES PATENT OFFICE.

KIRBY FITZPATRICK, OF OKLAHOMA, OKLAHOMA.

SPEED-REGISTER.

1,178,791.          Specification of Letters Patent.         Patented Apr. 11, 1916.

Application filed June 17, 1914. Serial No. 845,596.

*To all whom it may concern:*

Be it known that I, KIRBY FITZPATRICK, a citizen of the United States, residing at Oklahoma city, in the county of Oklahoma and State of Oklahoma, have invented certain new and useful Improvements in Speed-Registers, of which the following is a specification.

This invention relates to a new and useful improvement in speedometers, more especially to that class which is used on automobiles and locomotives.

The object of the invention is to produce a device which when in use will show at all times the exact speed at which the machine is running, also indicate to passers-by the limit of speed and to limit the speed.

The invention consists in a speedometer having an indicator consisting of several identical parts, each of which indicates the rate of speed and mechanism for connecting these indicating parts with the moving parts of the machine.

The invention consists further of a speedometer provided with means for indicating to passers-by the limit of speed.

The invention consists in a speedometer provided with means for limiting the speed and preventing the machine from exceeding the speed limit.

The invention further consists in details of construction.

In the annexed drawings: Figure 1 is a perspective view of the case containing the speedometer mechanism provided with the invention. Fig. 2 is a longitudinal section through the mechanism of the device and showing the parts in one position. Fig. 3 is a detail plan view. Fig. 4 is a view partly in section and partly in plan of a detail, showing the speed limiting device. Fig. 5 is a longitudinal section through part of the mechanism of the device showing the parts in another position. Fig. 6 is a similar view of the parts in a third position.

In these drawings the numeral 1 represents a holder, consisting of several, in the present instance, four, frames 2, 3, 4 and 5, resting on feet 6, 7, 8 and 9 and having at their tops the annular bearings 10, 11, 12 and 13, the feet touching one another, but the main parts of the frames and the bearings being spaced apart. In the spaces among the frames are located the three cup-shaped disks 14, 15 and 16, having hollow hubs 17, 18 and 19 which rest, so as to turn in the bearings 10, 11, 12 and 13. These cup-shaped disks 14, 15 and 16 have the rims 20, 21 and 22 on which are placed numerals in regular spaced order from 1 to any desired number, such as 30, the numbers and spacing and the order being identical on the three rims. Each rim also has a number of contact points 23, 24 and 25, placed at any desired number on the rim, as for example 10, 20, 30. Each disk has within it a coiled spring, one end of which is secured to the disk and one end to a bearing the location of the spring being such as to return the disk to position when rotated as will be described.

Passing centrally within the hubs 17, 18 and 19 are the central shaft 26, a cylindrical box 27 surrounding the shaft 26 and a cylindrical sleeve 28 surrounding the box 27. The shaft 26 has an extension 29 beyond the inner end of the box 27 and the box 27 has an extension 30 beyond the inner end of the sleeve 28. This sleeve 28 has its outer end formed as a gear wheel 31 and with a shoulder 32 forming a reduced end 33 on the inner end of the sleeve 28.

The shaft 26 has a reduced portion 34 within the outer end 35 of the box 27 and a pin 36 passing through the box 27 and within the latter holds the shaft and box so that the shaft may rotate in the box but both be moved together lengthwise, and yet with end play between them. The sleeve 28 has in its outer end 37 around its bore, two circular recesses of different sizes. In the smaller and inner recess is held a collar 38 on the outside of the outer end 39 of the box 27. A plate 40 is secured in the outer and larger recess to the end 37 of the sleeve 28 and resting against the collar 38 holds the box 27 and sleeve 28 so that the latter may rotate on the former and both be movable together endwise. On the outer end of the shaft 26 is placed a gear wheel 41. Secured to the inner ends 29, 30 and 33 of the shaft 26, box 27 and sleeve 28 are pairs of springs placed at the ends of a diameter. These springs 42, 43 and 44 have ends 45, and the elasticity of these springs is such that when they are within the hubs of the disks they bear with a constant pressure upon the inside of these hubs. Adjacent to the shaft, box and sleeve is another shaft 46 having gear wheels 47 and 48, engaging the gear wheels 31 and 41, the latter being narrower than the former. The shaft 46 also has a pinion 49 for engagement with any mechanism such as a cyclometer, for turning shaft 46. This shaft has one end 50 enlarged and in the outer surface of this enlarged end is cut an oblique circumferential groove 51.

To the outer end 39 of the box 27 is secured the inner end 52 of a bar 53 the outer end 54 of which is pivoted to the end 55 of a rod 56, the other end 57 of which is pivoted to the pin 58 of a disk 59 fastened on a shaft 60. This disk 59 has at its edge a projection 61 which extends out radially from the disk and also extends out sidewise so as to have a portion out of the plane of the disk. Adjacent to the disk 59 is a spool 62 upon a shaft 63. This spool has the three projections, 64, 65 and 66, the first and third at the ends and the second at the middle. The projections 64 and 66 (Fig. 5) are made under-curved, having recesses 67 and 68. The projection 65 extends partially around the middle of the spool and has flat sides 69 and 70. The shaft 63 has a gear wheel 71 for connecting with a clock. The size of the spool 62, the disk 59, the projections 61, 64, 65, 66, the shape, size and location of the projections are all so adjusted that there will be one revolution of the disk 59 for one minute of time. The action of the construction will hereafter be explained. The spool 62 is also provided with two sets 72 and 73 of gear teeth which mesh with gear wheels 74, 75 of any ordinary set of feed rollers 76. Through these rollers in the usual way is to be passed and fed any ordinary strip of tape 77. To the side of the disk 59 opposite to the spool is located a frame 78 having at its ends the two arms 79 and 80, and at its middle a guide 81. In the arm 79 is horizontally pivoted a lever 82 one end 83 of which bears in the oblique groove 51 of the shaft 46 and the other 84 carries a marker. In the arm 80 is vertically pivoted a lever 85, one end 86 of which is in the path of the projection 61 of the disk 59 and the other end 87 of which carries a stylus 88 passing down through the guide 81. On shaft 60 of the disk 59 is keyed a pinion 89 which is engaged by a toothed wheel 90 to which movement is given by a spring, the direction being such as to turn the projection 61 on the disk 59 from the projection 64 to the projections 65 and 66 and back to the projection 64.

A rod 91 is suitably located in insulated bearings so as to pass across the three disks 14, 15 and 16 and is provided with three contact points, 92, 93 and 94, one opposite each disk 14, 15 and 16. This rod 91 is endwise movable in the barrel 95 of the wheel 96 by means of a wheel 97, having a pointer and dial 98 with speed limit numbers, such as 15, 30, 45 and 60. This wheel 96 has teeth which engage the teeth of a wheel 99 on a shaft 100. The relation of the wheels 96 and 99 are such that one rotation of the former makes a one half rotation of the latter. The shaft 100 projects out to some conspicuous position and has on its end a wheel 101 on the periphery of which is placed in opposite order in two sets the same numbers that are on the dial, so that the numbers are readable from either side of the wheel 101. This wheel is in a case 102 having an opening 103 on each side through which the limit number may be seen.

The apparatus described is to be placed in the case 104 (Fig. 1) so that the disks 14, 15 and 16 shall be in line with the three openings 105, 106 and 107 in the top of the case 104. If desired, within the case at the top and under these openings 105, 106 and 107, may be placed a shutter 108 having a hole 109. This shutter has a stem 110 connected by a rod 111 with the box 27 so that the shutter 108 and the box 27 may move together.

With the parts located as indicated in Fig. 2, power is to be applied at the pinion 49, the clock connected with gear wheel 71 being in motion and the spring of the toothed wheel 90 wound for action. As indicated in Fig. 2, the springs 42, 42 on the end of the shaft 26, hereafter called "the solid clutch," are out of contact with their disk 16, the springs 43, 43 of the box, hereafter called "the brake," are in contact with the outer disk 16, and the springs 44, 44 of the sleeve 28, hereafter called "the hollow clutch," are in contact with the middle disk 15. The inner solid clutch 26 is for the outer disk 16, the middle brake 27 is for all the disks and the outer hollow clutch 28 is for the middle disk 15, and the inner disk 14 and the lengths of the two clutches and the brake are so adjusted that these parts will have their due endwise movements to perform their functions. As the shaft 46 is rotated, the wheels 48, 41 and the wheels 47, 31 rotate the solid clutch 26 and the hollow clutch 28, respectively. The springs 44, 44 of the hollow clutch 26 being in contact with the disk 15 cause the latter to turn, winding up its inner spring (shown in section in disk 16). As this occurs, the clock turns the shaft 63 and spool 62. By this movement, the projection 64 at the end of the spool 62 is moved away from the projection 61 of the disk 59 and the latter is released. The spring of the toothed wheel 90 turns this wheel and, through the pinion 89 and shaft 60, the disk 59 until the projection 61 comes into contact with the projection 65 at the middle of the spool 62, momentarily checking the movement of the disk 59. As this disk 59 is thus partially turned, through the rod 56 and the bar 53, it draws the brake 27 and with it the hollow clutch 28. The solid clutch is not affected by this movement as the pin 36 and reduced portion 34 of the solid clutch 26 permit endwise play between the brake 27 and the solid clutch 26. This brings the several parts to the position shown in Fig. 5. Here the springs 42, 42 of the solid clutch 26 are still out of contact with their disk 16, the springs 43, 43 of the brake 27 have been moved out of contact with the disk 16 and into contact with the disk 15 and the springs 44, 44 of the hollow clutch 28 have been moved out of contact with the disk 15 and into contact with the disk 14. As the spool 62 continues to turn, the projection 65 thereon is moved away from the projection 61 of the disk 59 and the latter is released. The toothed wheel 90 then turns the disk 59 until the projection 61 of the latter comes in contact with the projection 66 at the other end of the spool 62, momentarily checking the movement of disk 59. As the disk 59 is thus again partially turned, through the rod 56 and bar 53, it draws the brake 27, and with it both the hollow clutch 28 and the solid clutch 26, the pin 36 of the brake 27 having reached the end of its traverse along the reduced portion 34 of the solid clutch 26, on the first partial movement. As this second partial movement takes place, the parts are moved from the position shown in Fig. 5 to the position shown in Fig. 6. Here the springs 42, 42 of the solid clutch 26 are brought into contact with the disk 16, the springs 43, 43 of the brake 27 have been moved out of contact with the disk 15 and into contact with the disk 14, and the springs 44, 44 of the hollow clutch 28 have been moved out of contact with the disk 14. As soon as the spool 62 is further turned so as to move its projection 66 from the projection 61 of the disk 59, the latter is at once returned until the projection 61 again is caught by the projection 64. The several actions thus described, produce a rotary movement of the solid and hollow clutches, not the brake, with an intermittent endwise movement of the three parts, the brake and hollow clutch have two endwise movements in one direction; the brake, hollow clutch and solid clutch having one endwise movement in the same direction and all three having together one endwise movement in the other direction. As these movements take place, the disks 14 and 15 are rotated by the clutch 28 and the disk 16 is rotated by the clutch 26, and the brake 27 holds the three disks in the desired position. This mechanism is placed within the speedometer case 102, with the disks 14, 15 and 16 in line with the openings 103, 104 and 105, the shutter 106 being in place between the rims of the disks and the openings of the case.

As the disks are rotated by the clutches, the numbers upon the rims of the disks pass under the openings in the case. The adjustment of the parts is such that when a clutch comes to the limit of its throw, it passes from the disk which it has turned and the brake immediately catches that disk and holds it temporarily at the opening. At the same time the shutter is so moved as to bring its hole at the opening for this disk and close the other two. As soon as the brake is released from this disk, the spring of the latter returns it to position, another disk is turned, a number on this disk brought to the opening, the shutter is moved so as to disclose this number and the operation continues. The rotation of the two clutches is coincident with the speed of the machine. The endwise movement is controlled by the clock. The latter is regular and constant whatever the speed. The parts are adjusted so that this endwise movement shall take place at certain predetermined intervals. Each clutch will be rotated a certain distance in each interval, and hence will turn its disk a certain distance in that interval. The numbers of the disk brought to the opening indicate the distance traveled in the interval. As the parts described are in action, the spool 62 feeds the tape 77 through the rollers 76. The end 83 of the lever 82 moving in the oblique groove 51 of the shaft 46 causes the marker carried by the end 84 of the lever 82 to make an angular line on the surface of the tape, there being an angle for each revolution. As the disk 59 is moved from the projection 66 to the projection 64, the projection 61 passing under the end 86 of the lever 85 forces the stylus 88 down upon and marks the tape 77. The shaft 46 is to be geared to the cyclometer so as to turn once in any given space, for example one mile. As the marker indicates on the tape the revolutions of the shaft 46 and the stylus the time between similar phases of the angular line, there is registered the speed of the machine and a permanent record is made.

With the mechanism shown in Fig 4, the device is made to be limited automatically in speed. By moving the wheel 97, the contact points 92, 93 and 94 on the shaft 91 are brought in line with the contact points 23, 24 or 25 of the disks. The contact points 92, 93 and 94 are thus placed according to the limit of speed desired. As long as the machine is run within the limit, there will be no contact between a point on the disk and the points on the shaft. Should the machine be speeded up too fast, the clutches will rotate the disks so as to bring the contact points in contact with the contact points of the shaft. This will close the circuit through these points as the circuit wires are connected on one side to the disks and on the other side to the shaft. This closure immediately permits the current through the circuit to act as has been determined according to the kind of a machine upon which the device may be used. In a gas engine it may shortcircuit the current to the sparking plug. In a steam engine it would operate a motor arranged to close the throttle, set the brakes, or both. As the wheel 97 is turned, it also turns the shaft 100 and with it the wheel 101, in the case, bringing opposite the openings in the case the number at which the speed limit has been set. This will thus indicate to passersby the speed limit as the limiting device already described will preclude this limit being exceeded. To insure better contact between the ends of the springs and the interior of the hubs of the disks, the latter may be made roughened or with ribs as indicated in the drawings. Preferably these ribs should extend the entire width of the hubs, and the contacting several sets of springs should be spaced apart from one another so that the distance beween these points of contact will be a little less than the width of the hubs, thus insuring that the brake will catch before the clutch has let go.

By having several parts to indicate the speed, the rate for any space of time, say, a minute, is equally divided, and the rate for each period shown at the openings. Thus the rate of speed is kept continuously in view. One disk is held by the brake, one is loose and the other rotated to bring a number to the opening. With only one indicating part, the eye would have to be continually on the watch for it might fail to catch the highest number. With several indicating parts, the numbers recur at such short intervals that there is a continuous exposure at the openings in the case.

Having described my invention, what I claim is:

1. The combination, in a speedometer, of an indicating means comprising a plurality of indicating parts; clutching means adapted to rotate such indicating parts; clutching means adapted to hold such indicating parts against rotation, the latter clutching means adapted to operate alternately with the former; means for rotating the former clutching means; and means for giving end-wise movement to both clutching means.

2. The combination, in a speedometer, of an indicating means comprising a plurality of indicators; two rotation clutches adapted to operate each one of the indicators in its proper order; a brake adapted to hold each indicator against rotation when it has been properly rotated by one of the clutches; means for operating the rotation clutches; and means for giving end-wise movement to the clutches and the brake.

3. The combination in a speedometer of a plurality of identical indicating parts, a solid clutch for one of the parts, a hollow brake surrounding the solid clutch for all the parts, a hollow clutch surrounding the brake for the other parts, the clutches and brake having springs to engage the indicating parts, mechanism for rotating the clutches and mechanism for giving endwise movement to the clutches and the brake.

4. The combinaton in a speedometer of a plurality of identical indicating parts, a solid clutch for one of the parts, a hollow clutch for the other parts, a hollow brake surrounding the solid clutch and within the hollow clutch, for all three of the parts, a drive shaft geared to the two clutches for giving rotary movement thereto and mechanism for giving endwise movement to the clutches and the brake.

5. The combination in a speedometer of a plurality of identical indicating parts, a solid clutch for one part; a hollow clutch for the other parts; a hollow brake, surrounding the solid clutch and within the hollow clutch, for all of the parts; the clutches being rotatable on the brake and movable endwise therewith, the solid brake and hollow clutch being also movable on the solid clutch; mechanism for rotating the clutches and mechanism for giving endwise movement to the clutches and the brake.

In testimony whereof I affix my signature in presence of two witnesses.

KIRBY FITZPATRICK.

Witnesses:
R. FITZ PATRICK,
REGINALD J. B. PAGE.

Copies of this patent may be obtained for five cents each, by addressing the "Commissioner of Patents, Washington, D. C."